April 19, 1966 H. E. SCHULTZ 3,247,422
TRANSISTOR INVERTER BALLASTING CIRCUIT
Filed June 1, 1961
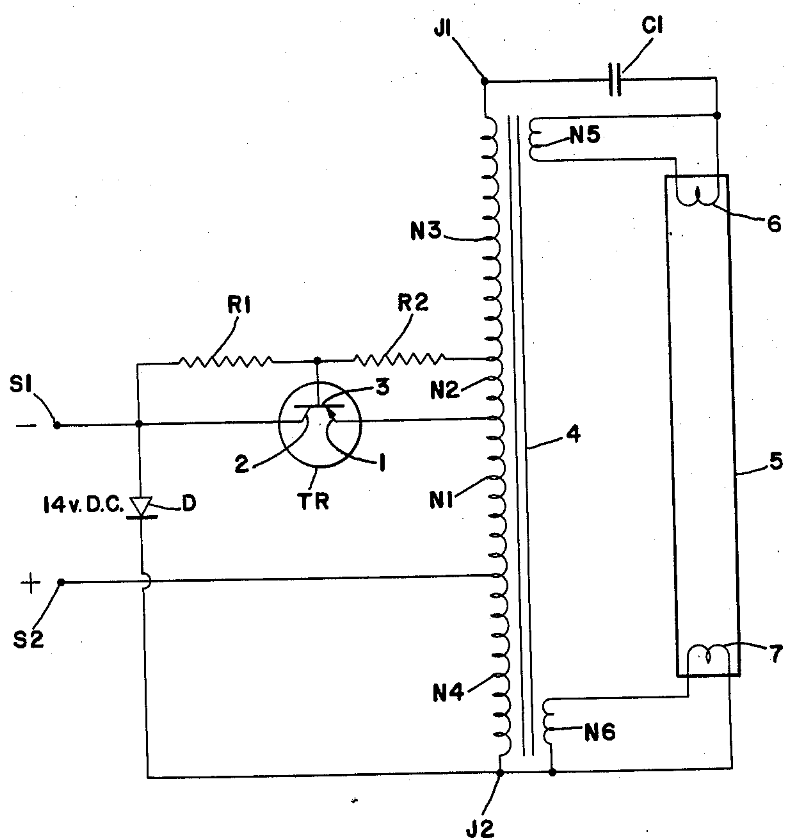
INVENTOR.
HARRY E. SCHULTZ
BY [signature]
HIS ATTORNEY United States Patent Office 3,247,422 Patented Apr. 19, 1966

3,247,422

TRANSISTOR INVERTER BALLASTING CIRCUIT

Harry E. Schultz, Euclid, Ohio, assignor to General Electric Company, a corporation of New York Filed June 1, 1961, Ser. No. 114,200
3 Claims. (Cl. 315—206)

This invention relates to transistor inverters using semi-conductor control devices or transistors for obtaining an alternating current output from a direct current supply, and is particularly concerned with such a circuit suitable for operating and ballasting an electric discharge lamp.

Transistor inverters provide a convenient means for obtaining alternating current from a direct current supply and are finding increasing use on account of their high efficiency. The circuits of this kind which have been devised to date having characteristics and over-all efficiency suitable for operating electric discharge lamps utilize two or more transistors. Transistors are relatively expensive circuit elements and when it is necessary to use a pair of them in a circuit, they generally turn out to be the most expensive part of the circuit combination.

The object of the invention is to provide an improved transistor inverter circuit which is low in cost and which has characteristics suitable for operating and ballasting an electric discharge lamp such as a fluorescent lamp having a negative impedance characteristic and requiring a higher voltage at starting than during normal operation.

A more specific object of the invention is to provide a transistor inverter circuit for discharge lamp operation using a single transistor and which is efficient and reliable in operation.

In accordance with the invention, the transistor is connected through its emitter-collector path in series with a winding of a step-up transformer across the direct voltage supply. Another winding in the transformer provides feedback to the base electrode of the transistor whereby to hold the transistor turned on until the core of the transformer saturates. The discharge lamp is connected across the secondary or output winding of the transformer and energy is transferred to it with one polarity until such time as the core saturates. Upon the occurence of saturation, current flow is cut off and energy is now transferred to the lamp with reverse polarity resulting from the collapse of flux in the core.

In a preferred embodiment, in order to stabilize operation and prevent excessive voltages from being developed in the transformer prior to starting of the lamp, a flyback control circuit is provided. This circuit comprises a diode connected between the output winding and one side of the direct current supply in such manner as to be back-biased when the transistor is turned on. When the transistor is turned off, if the voltage generated in the transformer by reason of the collapse of the flux is too high, the diode becomes forward biased and feeds energy back to the supply. Thus the flyback control circuit safeguards the transistor and conserves energy and is therefore an important and highly advantageous feature of the invention.

Other advantages and features of the invention will become apparent from the following description as developed in connection with the embodiment illustrated in the drawing. The features of the invention believed to be novel will be more particularly pointed out in the appended claims.

The single figure of the drawing is a schematic circuit diagram of a transistor inverter circuit embodying the invention for operating an electric discharge lamp.

Referring to the drawing, the direct current source or supply which suitably may be a 14-volt battery, is connected across input terminals S1, S2 with the polarity indicated. Of course other sources of direct current may likewise be used such as for instance a rectifier operating from the usual 115–120 volt, 60 cycle alternating current supply. Transistor TR used in this circuit is of the p-n-p junction type and the symbolic representation indicates the emitter electrode 1 by the angled line with arrowhead, the collector electrode 2 by the plain angled line, and the base electrode 3 by the base line. The transistor is turned on by forward biasing the base, that is by biasing the base electrode in the direction of the collector electrode. With the connections and polarities indicated, the transistor is turned on by making base electrode 3 negative with respect to emitter electrode 1.

Transistor TR is connected, through its emitter-collector electrode path, in series with winding N1 of transformer 4 across the direct voltage input terminals S1, S2. Transformer 4 is provided with windings N2, N3 and N4 all connected in series relationship with windings N1 and extending from both sides so that all four windings constitute an auto-transformer output or secondary winding. The load circuit connected across the transformer secondary comprises in series a current limiting impedance and a discharge lamp. The current limiting impedance used is a capacitor C1. The discharge lamp may conveniently be a fluorescent lamp 5 of the type having a filamentary electrodes which are heated at starting and during operation and commonly known as rapid start. Such lamps are bilaterally conducting, that is, they conduct current in both directions, as is well known. The transformer is provided with additional windings N5, N6 which are low voltage windings connected in circuit with electrodes 6 and 7 respectively of the lamp to supply heating current thereto. A rectifier D which may conveniently be a semi-conductor diode, is connected between the negative supply terminal S1 and output terminal J2 of the transformer at the end of winding N4.

The principle of operation is as follows. When voltage is first applied by connecting terminals S1, S2 to a suitable source (or, if already connected, by closing a control switch), some current will flow through transistor TR and winding N1. With the source polarities indicated, voltage will be induced in the transformer windings with a polarity which will be negative at terminal J1 and positive at terminal J2. The voltage generated in winding N2 and which is applied to the base 3 of the transistor through the voltage dropping combiation of resistors R2, R1 will tend to make the base negative relative to the emitter 1. In other words, the effect of incipient current flow in winding N1 is to bias the base of the transistor in the direction of the potential on the collector and the final result, by cumulative action, is to turn the transistor fully on. The rising current in primary winding N1 induces voltages in windings N1 to N4 which add in series through the auto-transformer connection and this total voltage is applied to the lamp 5 through the ballasting capacitor C1. During the time interval that the transistor is turned on, energy is being fed into and stored in the transformer inductance according to the relationship $1/2LI^2$, where L is the inductance of winding N1, and I is the current in winding N1 minus the transformed load current and the relatively small transformed base current. Prior to starting of the lamp, the load current component is relatively minor; however after the lamp has ionized, the load current component is considerable since it reflects the energy being translated into the lamp circuit.

After a period of time during which the transistor has been conducting, the core of transformer 4 saturates and the voltage induced in the windings then falls off to zero.

The voltage applied to the base and which has been biasing it in the direction of the collector, now begins to fall off and conduction through the transistor in the emitter-collector path likewise begins to fall off. This process is in a direction to collapse the flux in the transformer core and to induce a voltage of reverse polarity in the windings whereby terminal J1 becomes positive and terminal J2 negative. This process is cumulative and culminates in completely cutting off current flow through the transistor.

The rate of collapse of flux in the transformer core, and the voltage induced thereby in the transformer windings, is determined by three factors operating concurrently. The first is the transformer, particularly the core characteristics, eddy current losses, and hysteresis losses. The second is the circuit consisting of winding N4 and diode D which may be termed a flyback control circuit. During the period of flux collapse, the voltage induced in winding N4 is in a direction to make junction J2 negative and if the induced voltage in winding N4 exceeds the source voltage, diode D will be forward biased and conduction will take place. The third factor is the current through and voltage across the load circuit and will be different when the lamp is ionized and conducting than when the lamp is non-conducting.

It is desirable to use a powdered-iron or ferrite or molybdenum permalloy material, preferably in a closed or toroidal configuration, for the transformer core in order to reduce eddy current and hysteresis losses to a minimum. With such a core material, the rate of flux collapse in the transformer is not limited by the core material. Where there is a lamp in an ionized conducting state in the load circuit, the energy transferred to the load circuit limits the rate of flux collapse and there is no problem. However if the lamp is not yet ionized as at starting, or if the lamp should be removed or should become defective, the load circuit cannot effectively limit the rate of flux collapse. In the absence of countervailing measures, the resulting high voltages induced in the transformer windings may damage the circuit elements and in particular may destroy the transistor on account of the high voltage applied between collector and base or collector and emitter.

The solution to the above problem provided by the invention resides in the flyback control circuit consisting of winding N4 and diode D. As soon as the voltage induced in winding N4 (in a direction to make J2 negative) exceeds the source or supply voltage applied to terminals S1, S2, point J2 becomes negative with respect to point S1 and diode D becomes forward biased. The resulting current flow through diode D limits the voltage at point J2 substantially to the value of the source voltage. By transformer action, this also limits the voltages induced in windings N1 and N2, and applied to the emitter relative to the base or collector of the transistor, to a safe value. Typically, a safe value is one not exceeding four times the D.C. source voltage. At the same time the excess energy which has been stored in the transformer core is fed back into the source or D.C. supply through diode D, thereby conserving energy. The control action of the flyback circuit continues until the lamp is ionized and conducting so that it is absorbing energy from the circuit. During normal operation of the lamp, no conduction takes place through diode D and the flyback control circuit is quiescent.

The turns ratio of the total turns in the transformer to the turns of winding N4 is chosen so that while the flyback control circuit comprising winding N4 and diode D is limiting the induced voltage, the total voltage applied to the load circuit is sufficient to start the lamp. Winding N2 is designed to provide a suitable control voltage to the base of the transistor.

After the flux in the transformer core has collapsed, conduction again begins through the transistor, and the induced voltages turn the transistor fully on so that the cycle repeats. In general, the transistor passes sufficient energy during the conduction phase of the cycle to operate the lamp during that phase and also during the succeeding phase when the transistor is not conducting. Therefore during the conduction or flux build-up phase, half the energy passed by the transistor is supplied to the lamp and the other half is stored in the transformer core. During the non-conduction or flux collapse phase, the energy stored in the transformer core is transferred to the lamp.

In a circuit actually constructed in accordance with the figure of the drawing and tested in operation of a single 42T6 fluorescent lamp for a total load of 25 watts at 1700 cycles from a 14-volt battery supply, the following circuit constants were used and they are listed herein by way of example and not in order to limit the invention thereto:

| | |
|---|---|
| Transistor TR | Type 2N174 (Delco). |
| Transformer: | |
| Winding N1 | 30 turns No. 18 wire. |
| Winding N2 | 8 turns No. 26 wire. |
| Winding N3 | 600 turns No. 30 wire. |
| Winding N4 | 10 turns No. 20 wire. |
| Core | Molybdenum permalloy toroid O.D., 1.06"; I.D., 0.58"; height, 0.44". |
| Resistor R1 | 600 ohms. |
| Resistor R2 | 5 ohms. |
| Capacitor C1 | .015 microfarad. |

A 42T6 fluorescent lamp is of the instant start type and does not require preheat of the cathodes so that windings N5 and N6 were eliminated.

The specific circuit which has been described herein is intended as exemplary and not as limitative of the invention. Whereas the invention has been described using a p-n-p type transistor, an n-p-n type transistor may fully well be used with appropriate modification of the source polarity with respect to the circuit. Other modifications will occur to those skilled in the art. The appended claims are intended to cover any such modifications coming within the true spirit and scope of the invention.

What I claim as new and desire to secure by Letters Patent of the United States is:

1. An inverter circuit comprising a direct current source, a transistor having base, emitter and collector electrodes, a transformer having input and output windings and a saturable core, an input circuit comprising the emitter-collector electrode path of said transistor and said input winding connected in series across said source, a load circuit comprising said output winding, current limiting means and bilaterally conducting electric discharge lamp connected in series, a feedback connection from said output winding to the base of said transistor arranged to turn said transistor on during the phase of flux build-up in said core and to turn said transistor off after saturation in said core and during the phase of flux collapse subsequent thereto, and a flyback control circuit comprising a diode connecting one side of said source to a point in said output winding, the polarity of said diode being in a direction to become forward biased during the phase of flux collapse in said core, the location of said point in the output winding being such that conduction takes place through said diode only when energy is not being absorbed by said lamp whereby to feed energy back to said source and prevent the generation of excessively high voltages in said output circuit.

2. An inverter circuit comprising a direct current source, a transistor having base, emitter and collector electrodes, an auto-transformer having an input winding and output windings extending from both sides of said input winding and a saturable core, an input circuit comprising the emitter-collector electrode path of said transistor and said input winding connected in series across said source, a load circuit comprising said output winding, a capacitor and a bilaterally conducting electric discharge lamp connected in series, a feedback connection from a tap in one side of said output windings to the base of said transistor arranged to turn said transistor on during the phase of flux build-up in said core, and to turn said transistor off after saturation in said core and during the phase of flux collapse subsequent thereto, and a flyback control circuit comprising a diode connecting one side of said source to a point in the other side of said output windings, the polarity of said diode being in a direction to become forward biased during the phase of flux collapse in said core, the location of said point in the output winding being such that conduction takes place through said diode only when energy is not being absorbed by said lamp whereby to feed energy back to said source and prevent the generation of excessively high voltages in said output circuit.

3. An inverter circuit comprising a direct current source, a transistor having base, emitter and collector electrodes, an auto-transformer having an input winding and additional windings extending from both sides thereof the altogether forming an output winding on a saturable core, an input circuit comprising the emitter-collector electrode path of said transistor and said input winding connected in series across said source, a load circuit comprising said output winding, a capacitor and a bilaterally conducting electric discharge lamp connected in series, a feedback connection from a tap on the transistor connection side of said output winding to the base of said transistor arranged to turn said transistor on during the phase of flux build-up in said core and to turn said transistor off after saturation in said core and during the phase of flux collapse subsequent thereto, and a flyback control circuit comprising a diode connecting the side of said source connected to said transistor to a point in the source connection side of said output winding, the polarity of said diode being in such direction that it tends to become forward biased during the phase of flux collapse in said core, the location of said point in the output winding being such that conduction takes place through said diode only when energy is not being absorbed by said lamp whereby to feed energy back to said source and prevent the generation of excessively high voltages in said output circuit.

References Cited by the Examiner

UNITED STATES PATENTS 2,895,081 7/1959 Crownover et al. ----- 315—100

FOREIGN PATENTS 1,030,895 5/1958 Germany.
1,078,691 3/1960 Germany.

GEORGE N. WESTBY, *Primary Examiner.*

RALPH G. NILSON, *Examiner.*

C. R. CAMPBELL, *Assistant Examiner.*